United States Patent [19]

Ferrigno

[11] 3,864,140

[45] Feb. 4, 1975

[54] PIGMENTARY COMPOSITIONS WITH REDUCED WATER ABSORPTION

[76] Inventor: Thomas Howard Ferrigno, 29 Clover Hill Cir., Trenton, N.J. 08638

[22] Filed: Aug. 22, 1973

[21] Appl. No.: 390,525

Related U.S. Application Data

[63] Continuation-in-part of Ser. Nos. 306,926, Nov. 15, 1972, , and Ser. No. 356,055, April 30, 1973, , and Ser. No. 164,416, July 20, 1971, abandoned.

[52] U.S. Cl. .......... 106/308 Q, 106/288 B, 106/306
[51] Int. Cl. .......................... C09c 1/28, C08h 17/04
[58] Field of Search ........................ 106/308 Q, 309

[56] References Cited
UNITED STATES PATENTS

| | | |
|---|---|---|
| 2,668,151 | 2/1954 | Pedlow, Jr. et al. ............. 106/308 Q |
| 2,886,460 | 5/1959 | Alexander ....................... 106/308 Q |
| 3,366,501 | 1/1968 | Lamar ................................. 106/309 |
| 3,400,000 | 9/1968 | Hoffman ......................... 106/308 Q |

*Primary Examiner*—Winston A. Douglas
*Assistant Examiner*—J. V. Howard
*Attorney, Agent, or Firm*—Sperry and Zoda

[57] ABSTRACT

Comminuted minerals are combined with inorganic binders and formed into agglomerates which, when calcined to bond the particles one to another, contain internal voids and surfaces of minor porosity. The resulting pigmentary compositions are then treated with a class of surface modifying agents to further reduce the surface porosity as measured by water absorption.

14 Claims, No Drawings

PIGMENTARY COMPOSITIONS WITH REDUCED WATER ABSORPTION

SUMMARY OF THE INVENTION

In accordance with my prior applications, combinations of anhydrous and, hydrous silicates and opacifying minerals in particulate form, fluxing agents and inorganic temporary binders are combined to form agglomerates of suitable sizes and shapes by any of several methods. Calcining of the agglomerates provides permanent inter-particle bonds, internal porosity to obtain a multitude of reflecting surfaces to thereby cause substantial improvement in opacity, and surfaces of minor porosity. The pigmentary composition surface porosity may be as high as 10%, but preferably below 5%. The improvement herein relates to the reduction of surface porosity as measured by water absorption by the use of hydrolyzable organo-silanes as surface modifying agents which produce hydrophobic surfaces and thus render pigmentary compositions have very high water absorptions suitable for general use by effectively reducing their water absorptions to acceptable values.

THE PIGMENTARY COMPOSITIONS

Comminuted anhydrous silicate minerals have refractive indexes about the same as most organic polymers, oils, waxes and the like used in many compositions such as paints, plastics, adhesives, caulks, and rubber. When such particulate minerals are used as fillers in these compositions, they contribute very little opacity due to the relatively minor differences in refractive indexes. When these particulate minerals are combined with suitable inorganic temporary binders, formed into agglomerates and calcined to consolidate the masses, a pigmentary composition is formed having internal reflecting surfaces, reduced specific gravities compared with the parent minerals and surfaces of minor porosity, resulting in substantially improved opacity.

The resulting pigmentary compositions have specific gravities in the range of 60 to 95% of that of the mineral content, and porosities of 10% or less by weight as measured by water absorption.

It has now been discovered that products of the foregoing applications having water absorptions of greater than 10%, or even less than 10%, can be treated with a class of agents which induce hydrophobicity and thus render the pigments of my invention more generally useful, less expensive to process, much simpler to process and much less susceptible to processing problems. The surfiers (surface modifiers) most useful are those known as hydrolyzable organo-silanes. These agents react with electro-negative surfaces (typical of silicate minerals and many oxides) through the silanol or reactive groups to adduce to the surface. The residual organo groups attached in turn to the silanol groups provide water repellency.

OBJECTS OF THE PRESENT INVENTION

A primary object of the present invention is to render prior pigmentary compositions, which would not ordinarily be suitable for use in applications demanding low water absorptions, to be completely satisfactory.

Another object is to reduce the cost, time, and temperature and to conserve energy in the calcining process of the prior applications.

A further object is to eliminate processing problems such as localized sticking of the pigmentary compositions during calcining due to over-calcining or variations in processing temperatures by deliberately producing products which have water absorptions in excess of those most desirable for the intended applications, and thereafter to treat such products as described herein to produce pigmentary compositions having fully acceptable water absorption properties.

Yet another object is to improve the prior pigmentary applications which would have acceptable properties insofar as density reduction and water absorption is concerned to serve more demanding uses.

These and other objects of the present invention will be apparent in the description which follows.

PROPORTIONS OF INGREDIENTS

The present invention relates to all of the prior generic and modified pigmentary compositions of my invention. The following proportions apply; in parts by weight:

|  | General | | Preferred | |
| --- | --- | --- | --- | --- |
|  | Min. | Max. | Min. | Max. |
| Anhydrous Silicate Mineral | 30 | 99 | 39 | 98 |
| Hydrous Silicate Mineral | 0 | 40. | 0 | 30 |
| Inorganic Colorant | 0 | 5. | 0 | 5 |
| White Opacity Modifier | 0 | 20. | 0 | 10 |
| Inorganic Binder | 1 | 10. | 2 | 6 |
| Fluxing Agent | 0 | 10. | 0 | 10 |

The anhydrous silicate mineral constitutes an essential ingredient of this and the prior inventions. Since they are derived from naturally occurring ores, they will normally be associated with other classes of minerals or contaminants which may comprise up to about 10% of the anhydrous mineral content, which I define as being composed of substantially the following mineral classes of the group consisting of (1) silica, (2) berylium, magnesium and calcium silicates, (3) alumino silicates, (4) lithium, berylium, barium, sodium, magnesium, calcium and potassium aluminosilicates, and (5) mixtures thereof.

Although I prefer to use feldspar as the anhydrous mineral, which is a general term for mixtures and single species of alkali alumino-silicates, it will be apparent from the description which follows that it is only necessary that the calcining step be conducted in a manner sufficient to cause permanent bonding of the mineral particles after they have been formed into agglomerates.

The average particle size of the comminuted mineral may be as large as 100 microns, but preferably between 2 and 20 microns. Although the size of the agglomerate formed therefrom determines the average particle size to be used, the finer distributions provide more reflecting facets in the finally calcined pigmentary compositions, and therefore greater opacities.

Depending on the application, the mineral may be white-appearing in its comminuted state, or have an apparent color if used in pigmentary compositions designed to have particular colors by virtue of the parent minerals; both anhydrous and hydrous, or by the addition of inorganic colorants.

The Hydrous Silicate Mineral

As with the anhydrous mineral, the following group consists of substantially (90% or greater) of the classes of hydrous silicate minerals: (1) phyllosilicates, (2) sorosilicates, (3) opal and the zeolite group of the tectosilicates, (4) the amphibole group of the inosilicates, (5) perlite, which includes certain siliceous volcanic glasses which are hydrous derivatives of alkali feldspars and silica containing 2 to 6% water of constitution, and (6) mixtures thereof.

The particle size range for the hydrous silicates is more dependent on the parent ore than the anhydrous silicates which are generally ground to the desired particle size. Hydrous silicates may therefore range broadly in average particle size, but I have found that 0.5 to 20 microns is the preferred range. Again, color of the mineral depends on that desired for the pigmentary composition.

Opacity Modifiers

The opacity modifier, if desired, may be selected from two classes; white opacity modifiers or inorganic colorants. White opacity modifiers are those which are white in color and have refractive indexes substantially exceeding those of the anhydrous minerals. Among such agents are: titanium dioxide, both rutile and anatase; zirconium oxide; zirconium silicate; zirconium double silicates such as barium zirconium silicate, calcium zirconium silicate, magnesium zirconium silicate, zinc zirconium silicate and spinel which is zinc alumino silicate; zirconium carbonate; zinc oxide; zinc hydroxide; calcium titanium silicate; tin oxide; tin hydroxide; antimony oxide; arsenic oxide; sodium antimonate; and the like; and mixtures thereof. Mixtures such as calcium carbonate and magnesium carbonate with zirconium silicate may be used to form double silicates during the calcining operation. Inorganic colorants are those chiefly used in ceramics and may consist of iron oxide, manganese oxide, lead chromate, ultramarine blue and others in their simpler forms, or complex combinations and mixtures of indefinite composition or of a proprietary nature. Although the anhydrous forms are preferred, the hydrous forms may be used, providing that they do not exert an adverse effect on the properties of the pigmentary compositions.

Generally, it is advantageous to use opacifying agents which are somewhat finer in particle size than the minerals of my compositions. This provides greater efficiency, especially with colorants, but is not always necessary with the white opacifying agents since their distributions among the mineral particles is more significant than the staining effect produced by colorants of very fine particle size and low concentrations.

Fluxing Agents

Inorganic oxides, salts, frits, glasses and mixtures thereof melting or softening below the melting or softening temperature of the anhydrous mineral all have been found to be suitable. I especially prefer boric oxide or borate salts, but boric acid, lead oxide, barium oxide and the complex low-melting glasses and frits have all functioned satisfactorily. In order to obtain the most efficient distribution of the fluxing agent, it should be at least as fine as the finest mineral of the composition. Some salts or boric oxide are water soluble to a degree which promotes their distribution where the water content of the agglomerate forming mixtures is adequate. I have chosen the term fluxing agent to avoid confusion, although it may not in all cases actually act upon the mineral constituents to produce a softening or fluxing effect. I have observed that many glasses or frits soften below those temperatures at which the minerals soften and tend to bend the agglomerates at particle to particle junctures as well as to promote sealing of the agglomerate surface. Some softening of the mineral may occur, but this is not a necessity insofar as the results are concerned.

Inorganic Binders

The purpose of the inorganic binder is to provide temporary bonds between the mineral particles so that in the subsequent calcining step the formed agglomerate will retain its shape and resist the rigors of handling until permanent bonds are obtained. They may be used as dispersions, wetted solids or solutions and are selected from the group of expanding lattice montmorillonites, which are preferred, glassy sodium polyphosphates as described in U.S. Pat. No. 3,127,238, and soluble silicates which are alkali metal silicates forming solutions or collodial sols in water.

Agglomerate Formation

The preferred method involves mixing all of the dry ingredients with the inorganic binder in the form of a dispersion or solution and adequate water to accomodate the forming process. Depending on the size of agglomerate to be formed and its application, the mixture may be spray-dried, extruded and chopped, or pressure formed into discs, spheroids or any suitable shape. Agglomerate size will depend on the use to which the pigmentary composition is applicable, thus, for coatings the agglomerates may be as fine as 20 microns or as large as one centimeter for use in castings, caulks and the like. Each agglomerate must contain a multitude of particles in order to obtain opacity improvement over the minerals of its composition. It is obvious then that agglomerates as small as 20 microns require the use of minerals having average particle sizes as fine as 2 microns, whereas larger agglomerates may utilize those as large as 20 or even 100 microns.

Drying or partial drying of the agglomerate to 10% or less free water at 100° C forms adequately strong bonds to resist handling before and during the calcining step, and to preserve the configuration desired of the final calcined product.

Calcining

Calcining consolidates the agglomerate by permanently bonding the mineral and optionally added opacifiers into a structure having internal porosity and a surface of suitable porosity. Both the inorganic binder and optionally added fluxing agent aid in this process. A great latitude exists for the time and temperature of exposure to obtain the desired characteristics. Methods of calcining are chosen according to the size of the agglomerate. Thus; rotary, static, fluid-bed or moving belt furnaces may be employed provided that objectionable sticking of one agglomerate to another is avoided. Temperatures as low as 700° C for as little as one minute or less have been found to be operable when fluxing agents are used. Compositions containing high temperature softening combinations of ingredients are therefore limited only to the time-temperature relationship necessary to obtain the properties of the pigmentary compositions as stipulated in the claims.

The Pigmentary Compositions

The primary property of my products and the basis for invention lies with the discovery of the improvement of the opacity of low refractive index minerals. When a low refractive index comminuted mineral is uniformly surrounded by a transparent medium of similar refractive index, the mixture appears to the eye as a single transparent or nearly transparent phase. However, when the same low refractive index mineral is made into my pigmentary compositions and dispersed in the same manner, they are visible as opaque articles. Further, the pigmentary compositions have specific gravities between 60 and 95% of that of the minerals or optionally added materials of the composition. Surface porpsity, as measured by percent equilibrium water absorption by weight, is advantageously low but, as will be described later, may be corrected or adjusted to suitable values by the use of certain surfiers which prevent or interfere with the penetration of water into the surface pores or fissures of the pigmentary composition.

The Surfiers

Primarily useful are those agents known as hydrolyzable organosilanes, also called silane monomers, adhesion promoters and coupling agents. Useful classes are the chlorosilanes, and the alkoxysilanes, each containing alkoxy, alkyl, alkenyl, aryl or chlore radicals attached singly or in combination directly to the silicon atom. Among the useful chlorosilanes are tetrachlorosilane are ethyltrichlorosilane, amytrichlorosilane, phenyltrichlorosilane, methytrichlorosilane, vinyltrichlorsilane, dimethydichlorosilane, methylvinyldichlorosilane, and other derivatives of a similar nature. Tetrachlorosilane may be used as an intermediate whereby the hydrolysis product, silicon oxide or hydroxide, is subsequently reacted with another hydrolyzable organosilane or organic compound providing water repellency. The alkoxy silanes are somewhat easier to apply to the surfaces of the pigmentary compositions and are therefore preferred. Examples are: methyltrimethoxysilane, dimethyltrimethoxysilane, methyltriethoxysilane, dimethyldiethoxysilane, methyltriethoxysilane, ethyltriethoxysilane, amyltriethoxysilane, phenyltriethoxysilane, vinyltriethoxysilane, vinyltrimethoxysilane, vinyl-tris (2 methoxyethoxy) silane, vinyltriacetoxysilane, tetraethoxysilane and others.

The Surfation Process

The surfation (surface modification) methods consist of vapor or solvent deposition for the chlorosilanes and deposition from water or solvents for the alkoxysilanes. The principal difference in the two types of silanes lies with the products of the hydrolysis reaction. The Chlorosilanes liberate hydrogen chloride as a gas or, in the presence of sufficient water, as hydrochloric acid. It is apparent that the removal of HCl as gas or acid, is the limiting factor in the process. The alkoxysilanes hydrolyze to liberate acetic acid or lower alcohols, generally methanol or ethanol, of which the latter are very easily removed by aeration, mild heating or by just allowing the treated articles to remain exposed to ambient conditions until the alcohol has evaporated. In any event, hydrolysis occurs when the silane reacts with water either sorbed or added to the surface of the article. Siliceous surfaces, and many so-called acidic inorganic oxide surfaces, react with the product of hydrolysis (the silyl group) to form strong, permanent bonds to the pigmentary composition surface. By whatever method used, the surface acquires a deposit of residual siloxane compound to provide the degree of water repellency required.

The alkoxysilanes are preferred since they may be applied by dipping, spraying, tumbling or any suitable method from water solution or dispersion and the products of hydrolysis, along with excess water, are readily and easily removed.

Concentrations of the silanes depends on the surface area of the pigmentary composition. Thus it may be seen that large pigmentary article of my invention of about one cm would have very low surface areas and require as little as 0.005% by weight of the hydrolyzable silane to provide effective reduction of water absorption. The molecular weight of the silane governs its application rate since the hydrolyzable portion is dissipated as an alcohol or acid, leaving the organosiloxane attached to the treated article in sufficient concentration to provide the desired water repellency. For pigmentary compositions which have been spray-dried and consist of pigments as fine as 20 microns, as much as one percent may be required. This would be especially true if the water absorption were as high as, say, 20%, and it is desired to reduce the same to more practically useful values of 10% or less. For practical purposes, the silane concentrations will be classified according to the percent by weight of silane, before hydrolysis, applied to the pigmentary composition. Thus, I have found that the range of application rates to be from 0.005 to 1 % based on the weight of the pigmentary composition with 0.05 to 0.5% being preferred.

Over-calcining of the agglomerates can result in pigmentary compositions having surface fissures or microscopic cracks. Under-calcining, either deliberate or inadvertant, can produce surface pores large enough to admit water quite readily since most of these pigments are easily wet by water. In these cases, it is of great practical and economic benefit to apply silane surface treatments to recover or correct deficiencies which may otherwise render the pigments unsuitable for certain uses.

In the formulation of the pigmentary compositions it is also expedient to use somewhat larger average particle size minerals which do not melt or bond as readily or completely as their finer counterparts, and thus produce pigments having higher porosities. The costs of grinding or separation processes to obtain suitably sized ingredients are therefore reduced and the higher porosities resulting from their use in my compositions is readily correctable at very low cost.

In the condensation of the hydrolyzed silane on the surface of the pigment, a network of polysiloxane is generally produced if its concentration is equal to or greater than one molecular layer. In practice, it is found that the surface need not be completely or even uniformly covered with the polysiloxane to provide effective water repellency. For certain applications, however, it may be advantageous to apply a coating several molecular layers thick in order to prevent the loss of coating due to abrasion or similar influences in utilizing my pigments. Accordingly, many proprietary compositions containing silanes and other agents are offered commercially for use as waterproofing agents for concrete, cement block, brick and the like. It is therefore within the scope of this invention to use practically obtainable materials in the form of solutions, dispersions and emulsions which contain silanes and serve the purpose and intent of my invention.

The following examples describe treating methods and agents which are preferred, but are not limited to such methods. In practice, it is more expedient to treat the pigmentary compositions immediately after calcining, preferably while they are still hot. By this means, the pigments can be sprayed with a solution or dispersion of suitable silane in the normally used cooling drum or conveyor prior to packaging. The required concentration of agent would therefore be obtained along with cooling of the product without an additional step in the process. It is not always necessary to heat the pigment to obtain an intimately bonded or adequately functional silane deposit. The calcined, and cooled products could be tested for water absorption and a determination made as to the required concentration of silane to obtain a particular water absorption. Since certain of the silanes hydrolyze quite rapidly by reacting with the hydrogas in ambient air, it is then expedient to post-treat the pigments to obtain specific water absorption values using minimum concentrations of treating agents, or to adjust those which otherwise may not be completely satisfactory. At the very low concentrations of silanes required, a small amount of solvent (alcohol, for example) would evaporate by simple aeration as by feeding to a bagging bin through an open conveyor.

The type of surfier employed also influences the applications for my pigmentary compositions. Certain of the cited silanes contain vinyl groups which remain after hydrolysis to provide the required hydrophobicity and to further serve as cites which are reactive with unsaturated monomers or polymers. Such reactions provide chemical bonds between the pigment and the polymerized matter.

Because of their hydrophobicity, my treated compositions also improve the electrical properties of plastics, elastomers and similar compositions containing other types of pigments where water molecules at the pigment-polymer interfaces would normally provide conductance bridges.

EXAMPLE 1

In all of the following examples pigmentary compositions of my prior applications were hand-formed or pressure-formed into small discs, calcined under the indicated conditions, cooled and then treated. In this example, the discs were treated with a 1% water solution of Union Carbide A-172; vinyltris (2 methoxyethoxy) silane. The solution was added to the weighed discs to obtain the indicated concentration, tumbled to obtain uniform deposition and dried for 10 minutes at 121°C. Water absorption was determined by weighing the discs, placing them in distilled water for from 15 to 30 minutes, or until equilibrium sorption occurred, shaking them lightly on a paper towel to remove adhering water, and weighing. The entire procedure was carried out at room temperature.

The feldspar used was an anorthoclase type, having an average particle size of 11 microns and a total range of about 0.5 to 100 microns. The silica had an average particle size of 10 microns and was white, as was the feldspar. The kaolin was a Georgia kaolin produced by water fractionation and had an average particle size of 3.5 microns with a typical tan color. The zirconium silicate also had an average particle size of 3.5 microns and was white. Bentolite is a white purified montmorillonite of the Georgia Kaolin Company. It was made as a 14% dispersion in water, adjusted to 5% $Na_2O$ with sodium carbonate, in a high-shear blender.

It may be seen that somewhat different responses are obtained according to the concentration of the surfier and the pigmentary composition. As little as 0.053% of A-172 effectively reduced the water absorption of No. 2-12-2 from 2.2 to 0%. Pigmentary composition 2-26-4 contained a fine precipitated calcium carbonate; 100% minus 2 microns, in concentration which yields 10 parts by weight of CaO after calcining. Besides illustrating the wide range of composition of my products, the water absorption was reduced from 21.1% to 2.6%, or from a value much too high for general practical use as a filler in paints or plastics to one which would be suitable for all but the most demanding applications. It is also apparent that slightly higher A-172 concentrations would also reduce these values further or adjust them to values suitable for a particular use.

| Pigmentary Comp. No. | 2-26-1 | 2-26-2 | 2-26-4 | 2-26-7 | 2-12-2 |
|---|---|---|---|---|---|
| | | Parts by Wt. | | | |
| Feldspar | 38 | 28 | 23 | 40 | 96 |
| Silica | 38 | 28 | 23 | — | — |
| Kaolin | 20 | 40 | 40 | 38 | — |
| Zr Silicate | — | — | — | 20 | — |
| $CaCO_3$ | — | — | 17.9 | — | — |
| 14% Bentolite | 28.6 | 28.6 | 28.6 | 14.3 | 28.6 |
| Water | 10. | 7. | 18.5 | 14. | 8. |
| Calcining; min/C | | | 10/1150 | | 10/1100 |
| Water absorption; | | | | | |
| Initial | 8.7 | 13.9 | 21.1 | 8.8 | 2.2 |
| Treated | 6.4 | 10.5 | 2.6 | 6.4 | 0 |
| % A-172/wt. of discs | 0.13 | 0.19 | 0.37 | 0.12 | 0.053 |

EXAMPLE 2

In this example a similar vinyl silane was used, except that the hydrolyzable group was different. Z-6075, a product of Dow Corning Corp., is essentially pure vinyltriacetoxysilane which is readily soluble in water and hydrolyzes quite rapidly. It was prepared as a 5% solution in water and used immediately in the same manner of Example 1 except that the discs were dried at 150° C for one hour.

| Pigmentary Comp. No. | Run 4 * | 2-18-1 | 2-18-12 | 2-26-2 |
|---|---|---|---|---|
| Feldspar | 96. | 96. | — | See Example 1 |
| Silica | — | — | 86. | |
| Borax glass, -60 mesh | — | — | 10. | |
| 14% Bentolite, 5% $Na_2O$ | — | 28.6 | 28.6 | |
| 15.2% Bentolite, | | | | |

| Pigmentary Comp. No. | Run 4 * | 2-18-1 | 2-18-12 | 2-26-2 |
|---|---|---|---|---|
| 4% Na$_2$O | 26.3 | — | — | — |
| Water | 31.5 | 10. | 11. | — |
| Calcining; min/C | 1/1130 | 5/1150 | 5/1100 | 10/1150 |
| Water Absorption; | | | | |
|   Initial | Very high | 1.8 | 7.9 | 13.9 |
|   Treated | 0 | 0 | 1.0 | 0 |
| %Z-6075/wt of Pigment | 0.1 | 0.26 | 0.59 | 0.65 |

*Spray-dried to obtain spheroidal agglomerates, sieved to obtian +100 mesh, statically calcined and then sieved to remove −200 mesh material. The final product was therefore +74 microns.

The spray-dried pigments; Run 4, were too fine to determine the water absorption by ordinary means, but microscopic examination revealed that the spheroids, after calcining, allowed considerable penetration of water through surface pores. They also wet and dispersed very readily in water. After treatment the spheroids floated on the water, indicating complete hydrophobicity. After 20 days about 50% of the spheroids were still floating on the water. When Run 4 was treated with 0.2% Z-6075, the spheroids remained completely hydrophobic; all remained floating on water, for the same 20 day period.

It is again apparent that silane treatment, even at very low concentrations, is extremely effective for reducing the water absorptions of my pigmentary compositions.

EXAMPLE 3

In this example pigmentary composition 2-18-12 of Example 2 was over-calcined for 10 minutes at 1,150° C to obtain a slightly bloated product having a water absorption of 12.3%. Pigmentary composition 2-12-8 consisted of 56 feldspar, 40 impure pyrophyllite, 28.6 of 14% Bentolite dispersion adjusted to 5% Na$_2$O, and 10 water in parts by weight. Discs were made and calcined 10 minutes at 1,130° C. The pyrophyllite had an average particle size of 11 microns and a pink color.

The A-16, a product of Union Carbide Corp., consisting essentially of amyltriethoxysilane, was prepared as a 5% solution in denatured alcohol, added to the pigments and dried for 15 minutes at 150° C.

The Run 4 product was the same as used in Example 2.

| Pigmentary Comp. | Water Absorption Initial | Treated | A-16 %/wt. of Pigment |
|---|---|---|---|
| Run 4 | Very high | 0 | 0.11 |
| 2-18-12 | 12.3 | 2.9 | 0.43 |
| 2-12-8 | 5.8 | 1.3 | 0.46 |

Again it was demonstrated that the silanes very effectively reduce water absorption at very low application rates. In this case, an alkylsilane was found to be as effective as the previous alkenylsilanes.

I claim:

1. A pigmentary composition comprising calcined agglomerates ranging in size from about 20 microns to one centimeter and each embodying a plurality of particles of silicate mineral having an average particle size of from about 0.5 to 20 microns, said particles being bonded together so that the agglomerates have voids therein and a density of from about 60% to 90% of that of said silicate mineral in the agglomerates, said agglomerates having from about 0.005% to 1% by weight of a hydrolizable silane based on the weight of the agglomerates applied thereto and chemically bonded to the outer surface of the agglomerates in the form of a siloxane limiting the water absorption of the agglomerates to less than 10%.

2. A pigmentary composition as defined in claim 1 wherein said silicate mineral is an anhydrous silicate selected from the group consisting of silica; berylium, magnesium and calcium silicates; alumino-silicate; lithium, berylium, barium, sodium, magnesium, calcium and potassium alumino-silicates, and mixtures thereof.

3. A pigmentary composition as defined in claim 2 wherein said silicate mineral also includes hydrous silicate mineral selected from the group consisting of phyllosilicates, sorosilicates, opal and the zeolite group of tectosilicates, the amphibole group of inosilicates, perlite and mixtures thereof.

4. A pigmentary composition as defined in claim 1 wherein said agglomerates have a composition in parts by weight as follows:

| Anhydrous silicate | 30 to 99 |
| Inorganic silicate | 0 to 45 |
| Hydrous silicate | 0 to 40 |
| White Opacity Modifier | 0 to 25 |
| Inorganic Binder | 1 to 10 |
| Fluxing Agent | 0 to 10 |

5. A composition as defined in claim 1 wherein the amount of the silane present equals from about 0.05 to 1% of the weight of the agglomerate.

6. A pigmentary composition as defined in claim 4 wherein said silicate mineral is feldspar.

7. A composition as defined in claim 1 wherein the water absorption of the agglomerate is about zero.

8. The composition of claim 1, wherein the pigmentary composition has a water absorption of between 10% and greater than 0% by weight before and less than the original value after deposition on the surface thereof of an organo-silane.

9. A composition as defined in claim 1, wherein the silane on the surface of the agglomerate is deposited from a vapor.

10. A pigmentary composition as defined in claim 4 wherein said inorganic binder is selected from the group consisting of expanding lattice montmorillonites, sodium polyphosphates and soluble alkali metal silicates.

11. The composition of claim 1, wherein the silane is selected from the group consisting of tetraalkoxysilanes, alkylalkoxysilanes, alkenylalkoxysilanes, arylalkoxysilanes, tetrachlorosilane, alkylchlorosilanes, alkenychlorosilanes, arylchlorosilanes, and mixtures thereof.

12. The composition of claim 1, wherein the pigmentary composition has a water absorption of greater than 10% by weight before and less than 10% by weight after deposition thereon of from about 0.005% to about 1% by weight of the pigmentary composition of an organosilane selected from the group consisting of tetralkoxysilanes, alkylalkoxysilanes, alkenylalkoxysilanes, and mixtures thereof.

13. The composition of claim 1, wherein the pigmentary composition has a water absorption of between 10% and greater than 0% by weight before and less than the original value after deposition thereon of from about 0.005% to about 1% by weight of the pigmentary composition of an organo-silane selected from the group consisting of tetraalkoxysilanes, alkylalkoxysilanes, alkenylalkoxysilanes, and mixtures thereof.

14. The method of producing a pigmentary composition which comprises the steps of temporarily bonding a plurality of particles of silicate mineral together with an inorganic bonding agent in the presence of water to form agglomerated bodies, drying the resulting agglomerates to provide removal of water therefrom and assure the presence of voids therein, calcining the agglomerates to permanently bond the particles of silicate mineral together, and thereafter depositing an organo-silane to the surface of the calcined agglomerates to reduce the water absorbing property thereof.

* * * * *